US008793685B2

(12) United States Patent
Kidambi et al.

(10) Patent No.: US 8,793,685 B2
(45) Date of Patent: Jul. 29, 2014

(54) TECHNIQUES FOR OPERATING VIRTUAL SWITCHES IN A VIRTUALIZED COMPUTING ENVIRONMENT

(75) Inventors: Jayakrishna Kidambi, San Jose, CA (US); Amitabha Biswas, San Francisco, CA (US); John Buswell, Athens, OH (US); Dorit Rond, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 13/107,433

(22) Filed: May 13, 2011

(65) Prior Publication Data

US 2012/0291025 A1 Nov. 15, 2012

(51) Int. Cl.
*G06F 9/455* (2006.01)

(52) U.S. Cl.
USPC .......... 718/1

(58) Field of Classification Search
None
See application file for complete search history.

(56) References Cited

U.S. PATENT DOCUMENTS

| | | | | |
|---|---|---|---|---|
| 5,394,402 | A | 2/1995 | Ross | |
| 5,617,421 | A | 4/1997 | Chin et al. | |
| 5,742,604 | A | 4/1998 | Edsall et al. | |
| 6,304,901 | B1 | 10/2001 | McCloghrie et al. | |
| 6,567,403 | B1 | 5/2003 | Congdon et al. | |
| 7,593,320 | B1 | 9/2009 | Cohen et al. | |
| 7,848,226 | B2 | 12/2010 | Morita | |
| 8,060,875 | B1 * | 11/2011 | Lambeth | 718/1 |
| 2009/0213869 | A1 | 8/2009 | Rajendran et al. | |
| 2010/0223397 | A1 * | 9/2010 | Elzur | 709/235 |
| 2011/0029734 | A1 * | 2/2011 | Pope et al. | 711/118 |
| 2011/0032944 | A1 * | 2/2011 | Elzur et al. | 370/395.53 |
| 2012/0016970 | A1 * | 1/2012 | Shah et al. | 709/220 |
| 2012/0042054 | A1 * | 2/2012 | Kotha et al. | 709/220 |

OTHER PUBLICATIONS

Pettit et al., Virtual Switching in an Era of Advanced Edges, pp. 1-7, Nicira Networks, Palo Alto, California.
Pfaff et al., Extending Networking into the Virtualization Layer, pp. 1-6, Oct. 2009, Proceedings of the 8th ACM Workshop on Hot Topics in Networks (HotNets-VIII), New York City, New York.
Sherwood et al., FlowVisor: A Network Virtualization Layer, pp. 1-14, Oct. 14, 2009, Deutsche Telekom Inc. R&D Lab, Stanford University, Nicira Networks.
Yan et al., Tesseract: A 4D Network Control Plane, pp. 1-15, NSDI'07 Proceedings of the 4th USENIX conference on Networked systems design & implementation USENIX Association Berkeley, CA, USA 2007.
Hunter et al., BladeCenter, IBM Journal of Research and Development, vol. 49, No. 6, p. 905. Nov. 2005.
Ruth et al., Virtual Distributed Environments in a Shared Infrastructure, pp. 63-69, IEEE Computer Society, May 2005.

* cited by examiner

*Primary Examiner* — Emerson Puente
*Assistant Examiner* — Dong Kim
(74) *Attorney, Agent, or Firm* — Yudell Isidore Ng Russell PLLC

(57) ABSTRACT

A technique for operating a virtual switch includes determining network connection requirements for virtual machines controlled by a virtual machine monitor. Resources available, for processing data traffic of the virtual machines, are also determined. Finally, based on the network connection requirements and the resources available, a port of a virtual switch is selected to operate as a virtual Ethernet bridge or a virtual Ethernet port aggregator.

10 Claims, 4 Drawing Sheets

TECHNIQUES FOR OPERATING VIRTUAL SWITCHES IN A VIRTUALIZED COMPUTING ENVIRONMENT

BACKGROUND OF THE INVENTION

1. Technical Field

The present invention relates in general to virtual switches and, in particular to, techniques for operating virtual switches in a virtualized computing environment.

2. Description of the Related Art

The term 'utility computing' has been used to refer to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as "cloud computing," details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools, or applications that a cloud consumer can access and use through a web browser, as if the resources, tools, or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resources, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly associated with multiple different utility computing customers.

The virtualization of actual IT resources and management of VMs is typically provided by software referred to as a VM monitor (VMM) or hypervisor. In various implementations, a VMM may run on bare hardware (Type 1 or native VMM) or on top of an operating system (Type 2 or hosted VMM).

In a typical virtualized computing environment, VMs can communicate with each other and with physical entities in the IT infrastructure of the utility computing environment utilizing conventional networking protocols. As is known in the art, conventional networking protocols are commonly premised on the well known seven layer Open Systems Interconnection (OSI) model, which includes (in ascending order) physical, data link, network, transport, session, presentation, and application layers. VMs are enabled to communicate with other network entities as if the VMs were physical network elements through the substitution of a virtual network connection for the conventional physical layer connection.

Traditionally, virtual switches (vswitches) have been implemented (in software) within a VMM to provide connectivity between VMs controlled by the VMM and between the VMs and an external network. Traditional vswitches (or virtual Ethernet bridges (VEBs)) have performed all network traffic forwarding within an associated server completely in software or using software in combination with one or more network interface controllers (NICs). For example, in order to transfer information between VMs controlled by a same VMM, a VEB has performed a memory copy operation to transfer packets between VMs.

Recently, a newer class of vswitch, known as a virtual Ethernet port aggregator (VEPA), has been proposed. In general, vswitches implementing VEPAs do not perform local forwarding for traffic emanating from a VM completely in software. That is, in vswitches implementing VEPAs, all packets (including intra-VMM VM-to-VM packets) are transmitted on a link to a physical network switch. In the VEPA implementation, the physical network switch performs additional processing on the packets and transmits the packets back on the same link, when a destination VM is controlled by a same VMM as a source VM. In general, transmitting a packet back on a same physical switch port on which the packet was received has required a physical network switch to implement a feature known as 'reflective relay' on the port.

SUMMARY OF THE INVENTION

A technique for operating a virtual switch includes determining network connection requirements for virtual machines controlled by a virtual machine monitor. Resources available, for processing data traffic of the virtual machines, are also determined. Finally, a port of a virtual switch is selected to operate as a virtual Ethernet bridge or a virtual Ethernet port aggregator, based on the network connection requirements and the resources available.

DETAILED DESCRIPTION OF ILLUSTRATIVE EMBODIMENT

Typically virtual switches that employ virtual Ethernet bridges (VEBs) have lower latency (e.g., when local switching is employed), but have fewer advanced features, as compared to physical network switches. Moreover, VEBs written by different virtualization vendors may have substantially different functionality and may not adequately implement network policies. According to various aspects of the present disclosure, ports of a virtual switch are configured as either VEBs or virtual Ethernet port aggregators (VEPAs) based on network connection requirements for virtual machines (VMs) controlled by a virtual machine monitor (VMM) and resources available for processing data traffic of the VMs (e.g., resources available to the VMM).

Figure 1:
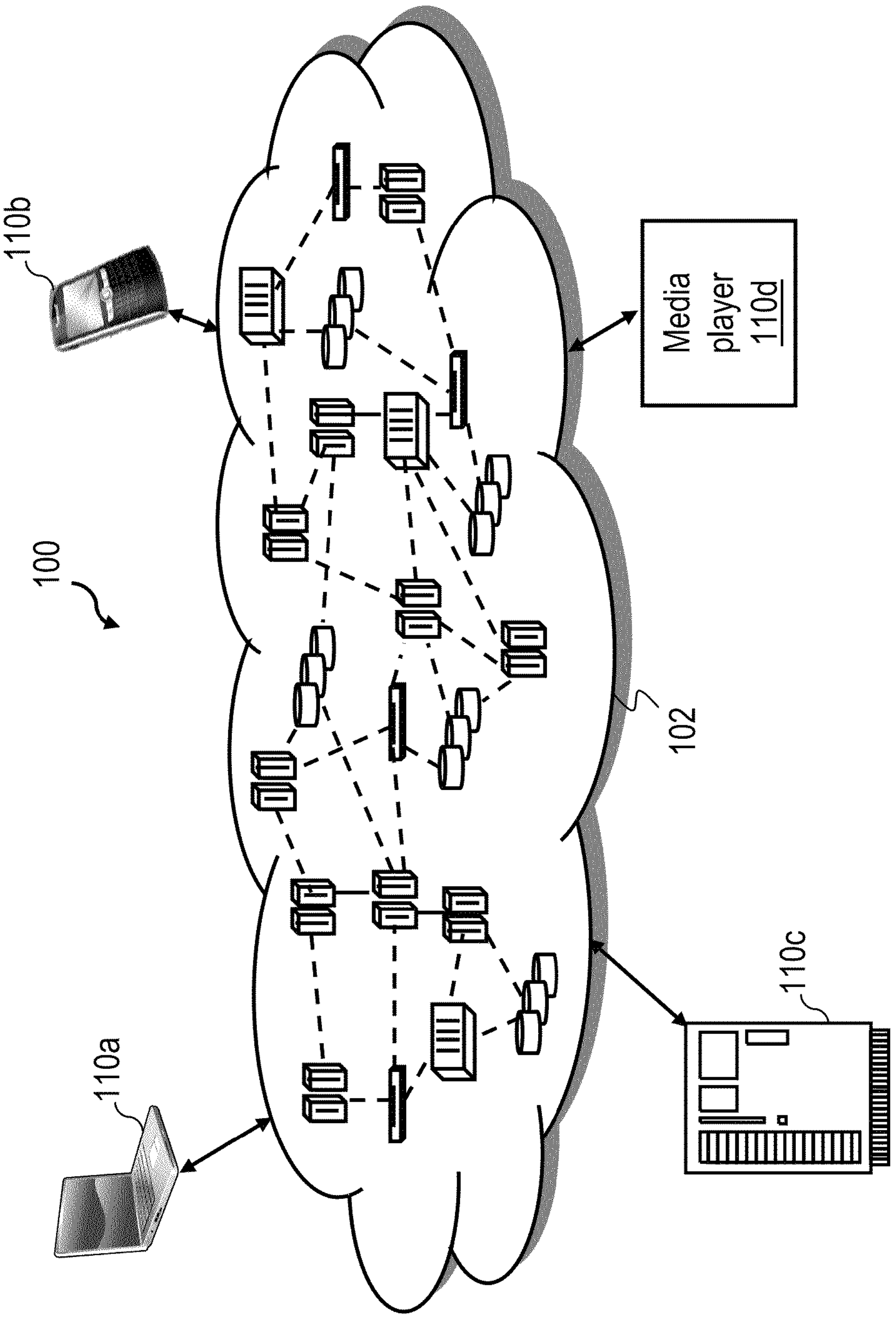
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment of the present disclosure. As shown, data processing environment 100, which in the depicted embodiment is a cloud computing environment, includes a collection of computing resources commonly referred to as a cloud 102. Computing resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms and/or software as services accessible to client devices 110, such as personal (e.g., desktop, laptop, netbook, tablet, or handheld) computers 110*a*, smart phones 110*b*, server computer systems 110*c* and consumer electronics 110*d*, such as media players (e.g., set top boxes, digital versatile disk (DVD) players, or digital video recorders (DVRs)). It should be understood that the types of client devices 110 shown in FIG. 1 are illustrative only and that client devices 110 can be any type of electronic device capable of communicating with and accessing services of computing resources via a packet network.

Figure 2:
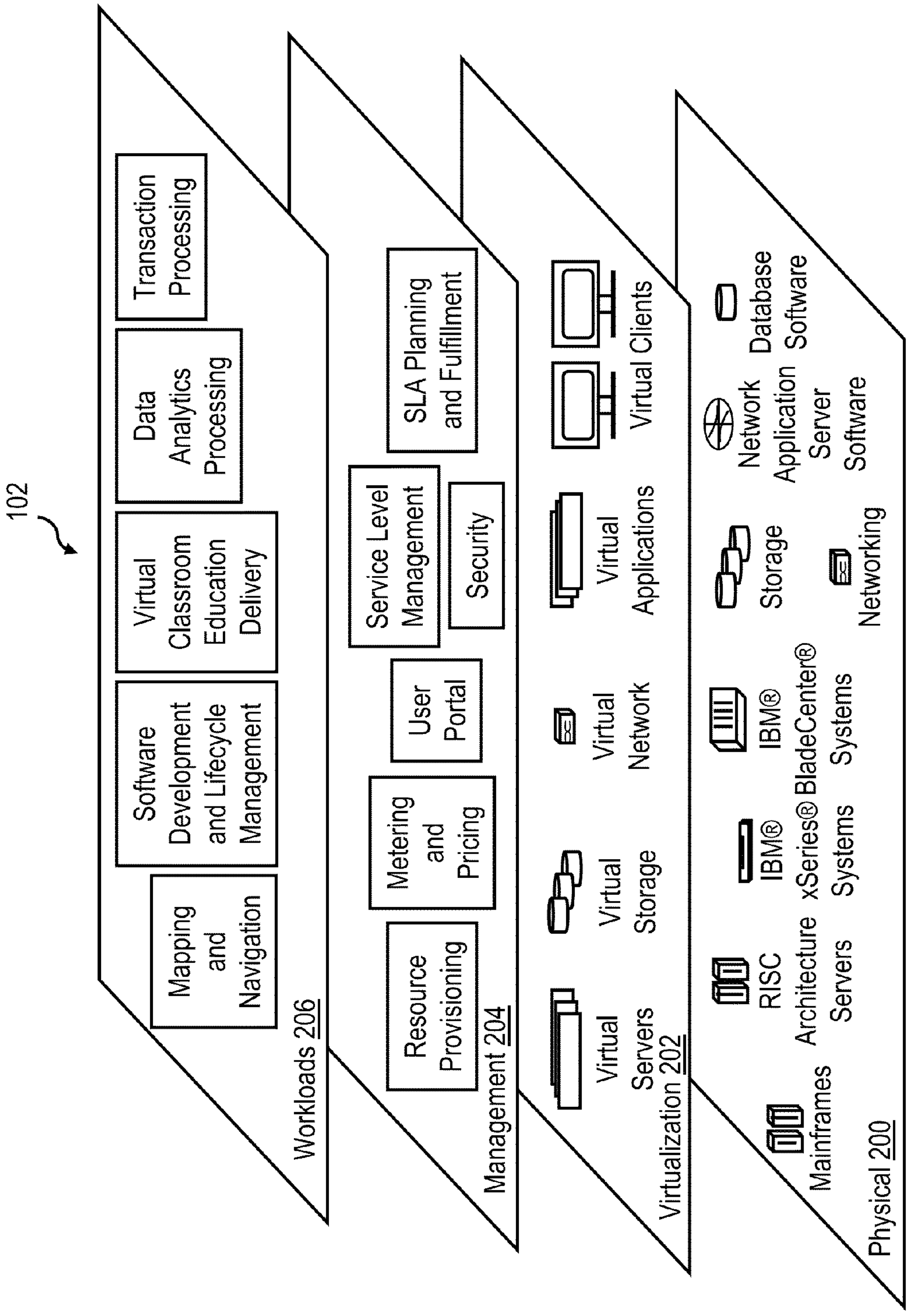
FIG. 2 depicts the layering of virtual and physical resources in the exemplary data processing environment of FIG. 1 in accordance with one embodiment.

FIG. 2 is a layer diagram depicting the virtual and physical resources residing in collection of cloud 102 of FIG. 1 in accordance with one embodiment. It should be understood that the computing resources, layers, and functions shown in FIG. 2 are intended to be illustrative only and embodiments of the claimed inventions are not limited thereto.

As depicted, cloud 102 includes a physical layer 200, a virtualization layer 202, a management layer 204, and a workloads layer 206. Physical layer 200 includes various physical hardware and software components that can be used to instantiate virtual entities for use by the cloud service provider and its customers. As an example, the hardware components may include mainframes (e.g., IBM® zSeries® systems), reduced instruction set computer (RISC) architecture servers (e.g., IBM® pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include operating system software (e.g., AIX, Windows, Linux, etc.), network application server software (e.g., IBM WebSphere® application server software, which includes web server software), and database software (e.g., IBM DB2®, database software). IBM, zSeries, pSeries, xSeries, BladeCenter, WebSphere, and DB2 are trademarks of International Business Machines Corporation registered in many jurisdictions worldwide.

The computing resources residing in physical layer 200 of cloud 102 are virtualized and managed by one or more virtual machine monitors (VMMs) or hypervisors. The VMMs present a virtualization layer 202 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by client devices 110 of cloud consumers on-demand.

The VMM(s) also support a management layer 204 that implements various management functions for the cloud 102. These management functions can be directly implemented by the VMM(s) and/or one or more management or service VMs running on the VMM(s) and may provide functions such as resource provisioning, metering and pricing, security, user portal services, service level management, and SLA planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 206, which may be implemented by one or more consumer VMs, provides examples of functionality for which the cloud computing environment may be utilized. Examples of workloads and functions which may be provided from workloads layer 206 include: mapping and navigation; software development and lifecycle management; virtual classroom education delivery; data analytics processing; and transaction processing.

Figure 3:
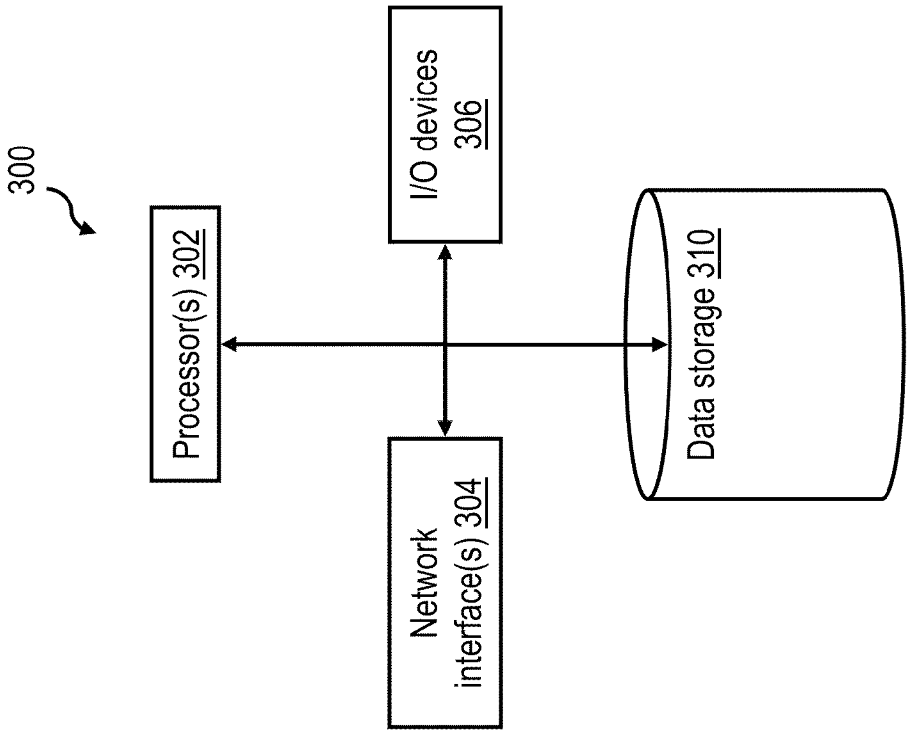
FIG. 3 is a high level block diagram of a data processing system in accordance with one embodiment.

With reference now to FIG. 3, there is illustrated a high level block diagram of an exemplary data processing system 300 that can be utilized to implement a physical host computing platform in physical layer 200 of FIG. 2 or a client device 110 of FIG. 1. In the illustrated exemplary embodiment, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 additionally includes one or more processors 302 that process data and program code, for example, to manage, access and manipulate data or software in data processing environment 100. Data processing system 300 also includes input/output (I/O) devices 306, such as ports, displays, and attached devices, etc., which receive inputs and provide outputs of the processing performed by data processing system 300 and/or other resource(s) in data processing environment 100. Finally, data processing system 300 includes data storage 310, which may include one or more volatile or non-volatile storage devices, including memories, solid state drives, optical or magnetic disk drives, tape drives, etc. Data storage 310 may store, for example, software within physical layer 200 and/or software, such as a web browser, that facilitates access to workloads layer 206 and/or management layer 204.

In utility or cloud computing environments such as that described with reference to FIGS. 1-3, virtual networks are commonly implemented to support communication between VMs. In conventional implementations, network traffic between VMs controlled by a same VMM have primarily been routed by a virtual switch that functions as a virtual Ethernet bridge (VEB).

Figure 4:
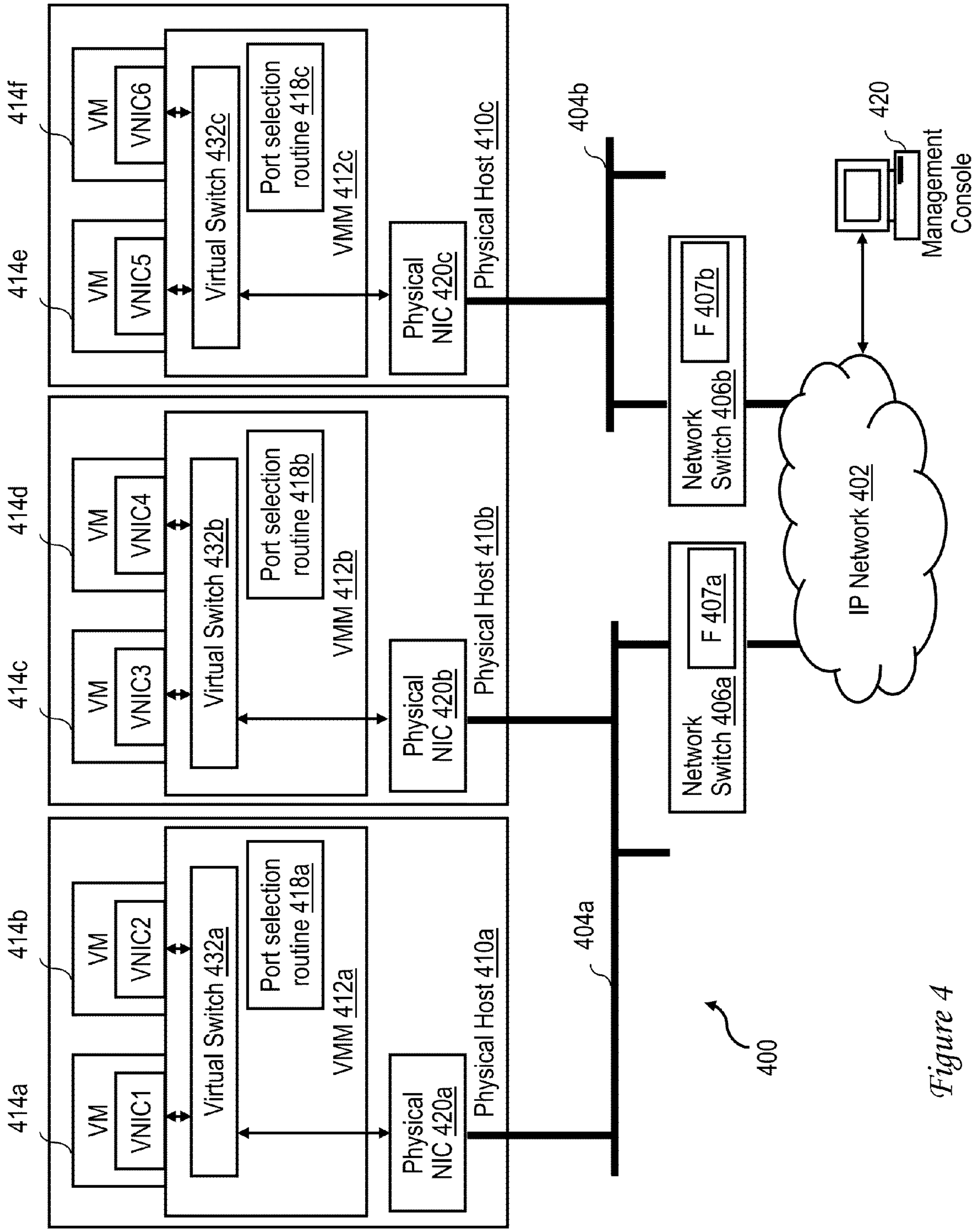
FIG. 4 is a high level block diagram of a portion of a data processing environment employing virtual networking in accordance with one embodiment.

Referring now to FIG. 4, there is depicted a high level block diagram of a portion of a data processing environment 400 employing virtual switches configured in accordance with one embodiment of the present disclosure. For example, data processing environment 400 can implement a portion of cloud 102 depicted in FIG. 1.

In the depicted embodiment, data processing environment 400 includes an Internet protocol (IP) network 402 including a plurality of network segments 404*a*, 404*b*, each of which is coupled to a respective one of physical network switches 406*a*, 406*b*. As is depicted, each of physical network switches 406*a*, 406*b* includes a respective forwarding data structure (e.g., a respective forwarding table (F)) 407*a*, 407*b* by which physical network switches 406*a*, 406*b* forward incoming data packets toward the packets' destinations based upon, for example, OSI Layer 2 addresses (e.g., based on MAC addresses) contained in the packets. Physical hosts 410*a*, 410*b* are coupled to network segment 404*a* and physical host 410*c* is coupled to network segment 404*b*. Each of physical hosts 410*a*-410*c* can be implemented, for example, utilizing a data processing system 300 as depicted in FIG. 3.

Each of physical hosts 410*a*-410*c* executes a respective one of VMM 412*a*-412*c*, which virtualizes and manages the resources of its respective physical host 410, for example, under the direction of a human and/or automated cloud administrator at a management console 420 coupled to physical hosts 410*a*-410*c* by IP network 402. VMM 412*a* on physical host 410*a* supports the execution of VMs 414*a*, 414*b*, VMM 412*b* on physical host 410*b* supports the execution of VMs 414*c*, 414*d*, and VMM 412*c* on physical host 410*c* supports the execution of VMs 414*e*, 414*f*. VMM 412*a* implements virtual switch 432*a* and port selection routine 418*a* in support of VMs 414*a*, 414*b*. Similarly, VMM 412*b* implements virtual switch 432*b* and port selection routine 418*b* in support of VMs 414*c*, 414*d*. Likewise, VMM 412*c* implements virtual switch 432*c* and port selection routine 418*d* in support of VMs 414*e*, 414*f*.

Port selection routine 418, which determines whether ports of virtual switch 432 are designated as VEB ports or VEPA ports, is further described below in conjunction with FIG. 5. It should be appreciated the while two VMs are illustrated as being deployed on each of physical hosts 410*a*-410*c*, more or less than two VMs may be deployed on a physical host configured according to the present disclosure. In various embodiments, VMs 414*a*-414*f* can include VMs of one or more cloud consumers and/or a cloud provider. In the depicted embodiment, each of VMs 414 has one (and may include multiple) virtual network interface controller VNIC1-VNIC6, which provides network connectivity at least at Layers 2 and 3 of the OSI model.

VM 414*a* utilizes VNIC1 to facilitate communication via a first port of virtual switch 432*a* and VM 414*b* utilizes VNIC2 to facilitate communication via a second port of virtual switch 432*a*. For example, when the first and second ports of virtual switch 432*a* are configured as virtual Ethernet bridge (VEB) ports, communications between VM 414*a* and VM 414*b* may be completely routed via software (e.g., using memory copy operations). As another example, when the first and second ports of virtual switch 432*a* are configured as virtual Ethernet port aggregator (VEPA) ports, communications between VM 414*a* and VM 414*b* are routed through physical NIC 420*a* and on network segment 404*a* to physical switch 406*a*, which routes the communications back to virtual switch 432*a* via network segment 404*a* and physical NIC 420*a*. Similarly, VM 414*c* and VM 414*d* utilize VNIC3 and VNIC4, respectively, to facilitate communication via different ports of virtual switch 432*b*. Likewise, VM 414*e* and VM 414*f* utilize VNIC5 and VNIC6, respectively, to communicate via different ports of virtual switch 432*c*.

According to various aspects of the present disclosure, each port of virtual switches 432*a*-432*c* may be independently configured as a VEB port or as a VEPA port. For example, a port between VNIC1 and virtual switch 432*a* may be configured as a VEB port or a VEPA port. In the case in which a VMM only manages two VMs, both ports of a virtual switch are typically configured as VEB ports or as VEPA ports at any given point in time. When a VMM manages more than two VMs, some ports of a virtual switch may be configured as VEB ports and other ports of the virtual switch may be configured as VEPA ports at any given point in time.

Typically, virtual switches that function as VEBs have lower latency (e.g., when local switching is employed), but have fewer advanced features, as compared to physical network switches. As previously noted, VEBs written by different virtualization vendors may have substantially different functionality and may not adequately implement network policies. Usually, implementing advanced features (such as a network access control lists (ACLs)) using a VEB requires more resources (e.g., more central processing unit (CPU) cycles when implemented in software, or more complex application specific integrated circuits (ASICs) when implemented in physical NIC hardware).

In the case where CPUs of a physical server (or ASICs of a NIC) are already highly loaded (e.g., greater than seventy-five percent), VEPA may be employed to off-load the additional CPU work associated with transferring packets between VMs controlled by a same VMM. While virtual switches that employ VEPA have higher latency (e.g., due to transferring packets over a peripheral component interconnect (PCI) bus to a physical network switch and back), virtual switches that employ VEPA usually more consistently provide advanced features as all traffic flows through a standards-compliant physical network switch. In the case where network policies require strict enforcement, implementing VEPA ports for virtual switches allows network policies to be enforced by a standards-compliant physical network switch, such as network switches 406*a*, 406*b*.

For example, a physical network switch may implement a network access control list (ACL) that applies desired rules to ports of the physical network switch. The rules may, for example, specify a list of hosts and/or networks that are permitted to use the ports (e.g., by specifying allowed IP and/or MAC addresses) or a type of traffic that is permissible for the ports (e.g., traffic may be classified based on an employed protocol and each traffic class may be subject to a different rate limit and/or prioritized relative to other traffic classes). In this manner, a physical network switch can utilize a network ACL to control both inbound and outbound traffic (similar to firewalls) in a relatively efficient manner, as contrasted with implementing the same functionality in a physical server (or a NIC).

In general, virtual switches that have specified either VEB or VEPA modes have functioned adequately in static environments. However, virtual switches that specify either VEB or VEPA modes may not be ideal for dynamic environments. According to various aspects of the present disclosure, an adaptive mechanism (i.e., port selection routine 418) is implemented (e.g., within VMM 412 or physical NIC 420) that controls ports of a virtual switch (e.g., virtual switch 432 or a virtual switch within physical NIC 420) to function as VEB or VEPA ports (on a per port basis), based on available resources and/or performance goals. Port selection routine 418 is generally configured to evaluate performance and functionality requirements of VM network connections, to determine available resources on a VMM 412, and to select which mode to use for a port connected to a VM 414.

In one or more embodiments, port selection routine 418 can be implemented at various times. For example, port selection routine 418 may be implemented at VM deployment (e.g., at initial deployment and/or migration) or as part of a load balancing mechanism. An assignment for ports of virtual switch 432 may remain static while a VM 414 is executing or may be changed during execution of a VM 414. For example, as part of a load balancing mechanism, a port of a virtual switch for an executing VM may be changed from a VEB to a VEPA based on, for example, a time-of-day or a day-of-the-week when a server load is known to vary.

In various embodiments, a VM marked as requiring low latency (e.g., as per a system administrator) may be connected to a VEB port of a virtual switch, while a VM requiring more access controls may be connected to a VEPA port of the virtual switch. In various embodiments, ports of a virtual switch may be independently configured as VEB or VEPA ports. In this manner, a VM whose needs change dynamically over time can be accommodated by switching an associated virtual switch port between VEB and VEPA modes.

When ports of virtual switch 432*a* are configured as VEPA ports, virtual switch 432*a* routes communications between VMs 414*a*, 414*b* to physical network switch 406*a* (over network segment 404*a*) using physical NIC 420*a*. When ports of virtual switch 432*a* are configured as VEB ports, virtual switch 432*a* routes communications between VMs 414*a*, 414*b* directly (using software or using software and physical NIC 420*a*). Similarly, virtual switch 432*b* routes communications between VMs 414*c*, 414*d* to physical network switch 406*a* (over network segment 404*a*) using physical NIC 420*b* when ports of virtual switch 432*b* are configured as VEPA ports. Likewise, virtual switch 432*b* routes communications between VMs 414*c* and VM 414*d* directly (using software or using software and physical NIC 420*b*) when ports of virtual switch 432*b* are configured as VEB ports. In response to ports of virtual switch 432*c* being configured as VEPA ports, virtual switch 432*c* routes communications between VMs 414*e*, 414*f* to physical network switch 406*b* (over network segment 404*b*) using physical NIC 420*c*. In response to ports of virtual switch 432*c* being configured as VEB ports, virtual switch 432*c* routes communications between VMs 414*e* and VM 414*f* directly (using software or using software and physical NIC 420*c*).

Figure 5:
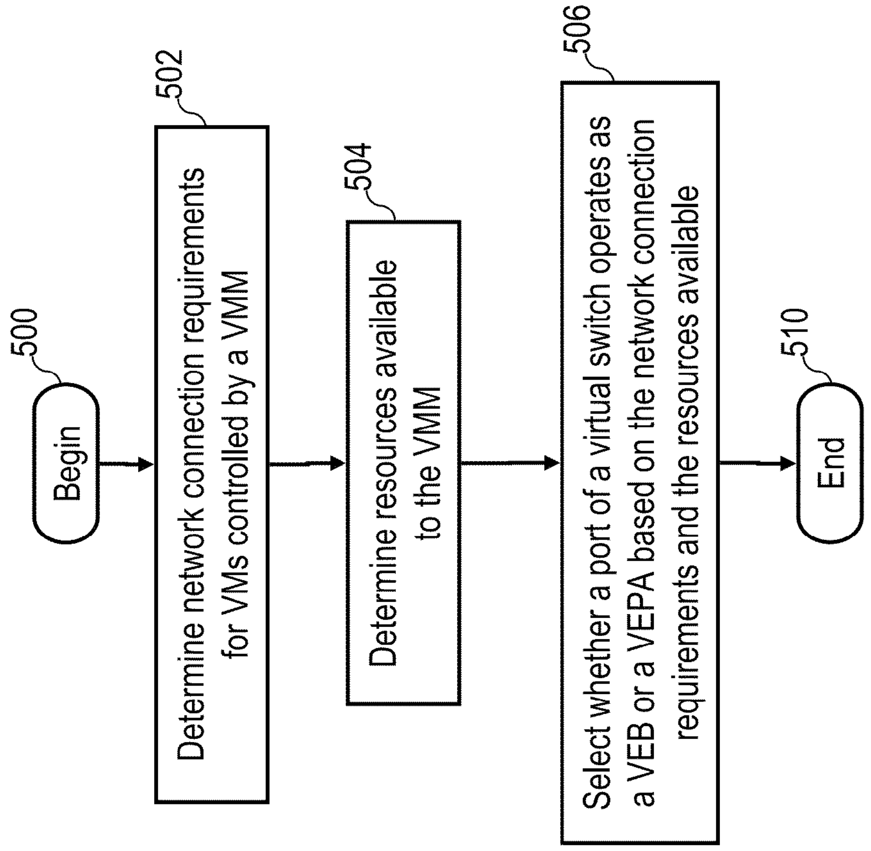
FIG. 5 is a high level logical flowchart of an exemplary method of configuring a virtual switch of a virtual networking environment in accordance with one embodiment.

With reference now to FIG. 5, there is illustrated a high level logical flowchart of an exemplary method of configuring a virtual switch of a virtual networking environment in accordance with one embodiment of the present disclosure. The flowchart of FIG. 5 depicts steps in logical rather than strictly chronological order. Thus, in at least some embodiments, at least some steps of a logical flowchart can be performed in a different order than illustrated or concurrently. The process illustrated in FIG. 5 can be performed by, for example, each VMM 412 (in data processing environment 400 of FIG. 4) executing port selection routine 418 or can be performed by each physical NIC 420.

The process begins at block 500 and then proceeds to block 502, where VMM 412 (or physical NIC 420) determines network connection requirements for VM 414 controlled by VMM 412. As discussed above, network connection requirements for a VM may, for example, be specified by a system administrator or be based on automatic selection for a traffic classification (e.g., traffic type, source MAC, destination MAC, and/or other fields of data traffic). As one example, when a VM has low latency requirements (i.e., a latency below a first predetermined time period of, for example, one microsecond), a virtual switch port of the VM may be selected to operate in VEB mode. Next, at block 504, VMM 412 (or physical NIC 420) determines what resources are available. For example, implementing advanced features using VEB requires more resources (e.g., more central processing unit (CPU) cycles when implemented in software). In the case where CPUs of a server (or ASICs of a physical NIC) are already highly loaded (e.g., greater than a selectable threshold, such as seventy-five or eighty percent), a virtual switch port may be configured as a VEPA port to off-load the additional CPU (or ASIC) work associated with transferring packets between VMs controlled by a same VMM.

Next, in block 506, VMM 412 (or physical NIC 420) selects whether a port of virtual switch 432 operates as a VEB or a VEPA port. For example, a per-port rule data structure (e.g., a table) may be maintained for each port to provide default and/or custom per-port rules for selecting either VEB or VEPA for the port. As one example, each port may have a list that specifies multiple rules, which can be applied in order with precedence given to rules earlier or later in the list. While virtual switches that implement VEPA ports have higher latency (e.g., due to transferring packets over a peripheral component interconnect (PCI) bus to a physical network switch and back), virtual switches that implement VEPA ports facilitate providing advanced features as all traffic flows through a standards-compliant physical network switch. In the case where network policies require strict enforcement (e.g., where access controls are required above a first access control level that specifies a list of hosts and/or networks that permitted to use the ports (e.g., by specifying allowed IP addresses), as contrasted with only specifying a type of traffic that is permitted over the ports), implementing VEPA ports allows network policies to be strictly enforced by a standards-compliant physical network switch. Following block 506, the process depicted in FIG. 5 ends at block 510.

While the present invention has been particularly shown as described with reference to one or more preferred embodiments, it will be understood by those skilled in the art that various changes in form and detail may be made therein without departing from the spirit and scope of the invention. For example, it should be understood that although the detailed description provided herein provides multiple embodiments of cloud computing environments, the teachings disclosed herein are not limited to cloud computing environments. Rather, embodiments can be implemented in any other type of computing environment now known or later developed, including client-server and peer-to-peer computing environments.

Further, although aspects have been described with respect to computer systems executing program code that direct the functions described herein, it should be understood that embodiments may alternatively be implemented as a program product including a storage medium (e.g., data storage 310) storing program code that can be processed by a data processing system to cause the data processing system to perform one or more of the described functions.

What is claimed is:

1. A data processing system, comprising:

data storage including program code; and a processor coupled to the data storage, wherein the processor is configured to execute the program code to:

determine network connection requirements for virtual machines controlled by a virtual machine monitor;

determine resources available for processing data traffic of the virtual machines; and select whether ports of a virtual switch operate as one of a virtual Ethernet bridge and a virtual Ethernet port aggregator based on the network connection requirements and the resources available, wherein a first port of the virtual switch is selected to operate as a virtual Ethernet bridge for a first virtual machine, included in the virtual machines, in response to the first virtual machine requiring a latency below a first predetermined time period and a second port of the virtual switch is selected to operate as a virtual Ethernet port aggregator for a second virtual machine, included in the virtual machines, in response to the second virtual machine requiring access controls above a first access control level.

2. The data processing system of claim 1, wherein the selecting occurs in response to initial deployment of one of the virtual machines.

3. The data processing system of claim 1, wherein the selecting occurs in response to migration of one of the virtual machines.

4. The data processing system of claim 1, wherein the network connection requirements for each of the virtual machines is specified by an administrator of the data processing system and the resources available for processing the data traffic of the virtual machines correspond to resources available to the virtual machine monitor.

5. The data processing system of claim 1, wherein the ports of the virtual switch are configurable to change between operation as the virtual Ethernet bridge and the virtual Ethernet port aggregator based on the network connection requirements for each of the virtual machines.

6. The data processing system of claim 1, wherein the selecting occurs in response to a load on the data processing system.

7. A program product including program code embodied in a non-transitory data storage device, the program code, when executed by a processor, configures the processor to:

determine network connection requirements for virtual machines controlled by a virtual machine monitor;

determine resources available for processing data traffic of the virtual machines; and select whether ports of a virtual switch operate as one of a virtual Ethernet bridge and a virtual Ethernet port aggregator based on the network connection requirements and the resources available, wherein a first port of the virtual switch is selected to operate as a virtual Ethernet bridge for a first virtual machine, included in the virtual machines, in response to the first virtual machine requiring a latency below a first predetermined time period and a second port of the virtual switch is selected to operate as a virtual Ethernet port aggregator for a second virtual machine, included in the virtual machines, in response to the second virtual machine requiring access controls above a first access control level.

8. The program product of claim 7, wherein the selecting occurs in response to initial deployment of one of the virtual machines or in response to migration of one of the virtual machines.

9. The program product of claim 7, wherein the ports of the virtual switch are configurable to change between operation as the virtual Ethernet bridge and the virtual Ethernet port aggregator based on the network connection requirements for each of the virtual machines.

10. The program product of claim 7, wherein the selecting occurs in response to a load on a server that executes the virtual machine monitor.

* * * * *